(12) United States Patent
Klockow et al.

(10) Patent No.: US 10,731,610 B2
(45) Date of Patent: Aug. 4, 2020

(54) AIR PIPE FOR THE INTAKE TRACT OF AN INTERNAL COMBUSTION ENGINE

(71) Applicant: BOS GMBH & CO. KG, Ostfildern (DE)

(72) Inventors: Klaus Klockow, Biebergemünd (DE); Christoph Donth, Wurzbach (DE)

(73) Assignee: ETM Engineering Technologies Marketing GmbH, Saalburg-Ebersdorf (DE)

( * ) Notice: Subject to any disclaimer, the term of this patent is extended or adjusted under 35 U.S.C. 154(b) by 0 days.

(21) Appl. No.: 15/751,730

(22) PCT Filed: Jul. 26, 2016

(86) PCT No.: PCT/EP2016/067751
§ 371 (c)(1),
(2) Date: Feb. 9, 2018

(87) PCT Pub. No.: WO2017/025315
PCT Pub. Date: Feb. 16, 2017

(65) Prior Publication Data
US 2018/0230950 A1 Aug. 16, 2018

(30) Foreign Application Priority Data
Aug. 12, 2015 (DE) .................. 10 2015 215 394

(51) Int. Cl.
*F02M 35/10* (2006.01)
*F16L 47/02* (2006.01)
(Continued)

(52) U.S. Cl.
CPC ....... *F02M 35/10321* (2013.01); *C08G 69/26* (2013.01); *C08G 69/36* (2013.01);
(Continued)

(58) Field of Classification Search
CPC .......... C08G 69/26; C08G 69/36; C08K 7/14; C08L 77/06; F02M 35/10157;
(Continued)

(56) References Cited

U.S. PATENT DOCUMENTS 6,103,805 A * 8/2000 Kojima ................... C08K 3/34
428/474.4
6,176,213 B1 1/2001 Arnegger
(Continued)

FOREIGN PATENT DOCUMENTS

CN 1556895 A 12/2004
CN 102827471 A 12/2012
(Continued)

OTHER PUBLICATIONS

International Search Report issued in Application No. PCT/EP2016/067751 with English translation dated Oct. 28, 2016 (7 pages).
(Continued)

*Primary Examiner* — Hung Q Nguyen
(74) *Attorney, Agent, or Firm* — Flynn Thiel, P.C.

(57) ABSTRACT

Air pipe for the intake tract of an internal combustion engine, for example a turbo engine, including a first pipe component composed of a first material and a second pipe component composed of a second material, the first material being more flexible than the second material.

13 Claims, 2 Drawing Sheets

(51) Int. Cl.
   *C08K 7/14* (2006.01)
   *F16L 27/08* (2006.01)
   *C08G 69/36* (2006.01)
   *C08L 77/06* (2006.01)
   *C08G 69/26* (2006.01)
   *F16L 11/08* (2006.01)
   *F16L 11/12* (2006.01)

(52) U.S. Cl.
   CPC .............. *C08K 7/14* (2013.01); *C08L 77/06* (2013.01); *F02M 35/1036* (2013.01); *F02M 35/10137* (2013.01); *F02M 35/10157* (2013.01); *F16L 27/0861* (2013.01); *F16L 47/02* (2013.01); *F02M 35/10209* (2013.01); *F02M 35/10262* (2013.01); *F16L 11/08* (2013.01); *F16L 11/12* (2013.01); *Y02T 10/144* (2013.01)

(58) Field of Classification Search
   CPC ......... F02M 35/10137; F02M 35/1036; F02M 35/10209; F16L 27/0861; F16L 47/02; F16L 11/08; F16L 11/12; Y02T 10/144
   See application file for complete search history.

(56) References Cited

U.S. PATENT DOCUMENTS

| | | | |
|---|---|---|---|
| 6,182,707 B1* | 2/2001 | Shiraki | B29C 45/0005 138/109 |
| 6,234,132 B1 | 5/2001 | Kopec et al. | |
| 6,439,621 B1 | 8/2002 | Altmann et al. | |
| 6,705,268 B2 | 3/2004 | Homsi et al. | |
| 8,383,244 B2 | 2/2013 | Bayer et al. | |
| 9,188,091 B2 | 11/2015 | Matzen | |
| 9,493,611 B2* | 11/2016 | Masunaga | C08L 77/02 |
| 2004/0070205 A1* | 4/2004 | Thomas | F16L 37/0985 285/307 |
| 2008/0011377 A1* | 1/2008 | Van Hooren | B29C 35/0266 138/118 |
| 2012/0123044 A1* | 5/2012 | Prusty | C08L 33/26 524/514 |
| 2013/0146170 A1* | 6/2013 | Jang | B29C 69/00 138/109 |
| 2014/0205783 A1* | 7/2014 | Jeol | C08G 69/00 428/36.9 |
| 2015/0159602 A1* | 6/2015 | Madeira | F02M 35/10321 123/184.61 |
| 2016/0221238 A1* | 8/2016 | Takeda | C08G 69/265 |
| 2016/0276055 A1* | 9/2016 | Choi | H05K 9/0079 |
| 2016/0347935 A1* | 12/2016 | Yabuya | C08L 77/06 |

FOREIGN PATENT DOCUMENTS

| | | |
|---|---|---|
| CN | 103574188 A | 2/2014 |
| DE | 40 32 321 A1 | 4/1991 |
| DE | 196 13 467 A1 | 10/1997 |
| DE | 197 01 118 A1 | 7/1998 |
| DE | 197 45 192 A1 | 4/1999 |
| DE | 199 15 819 A1 | 10/2000 |
| DE | 10 2004 053 985 A1 | 6/2006 |
| DE | 10 2006 032 751 A1 | 1/2008 |
| DE | 20 2006 016 187 U1 | 4/2008 |
| DE | 10 2007 007 119 A1 | 8/2008 |
| DE | 10 2009 044 014 A1 | 3/2011 |
| DE | 20 2012 103 603 U1 | 1/2013 |
| DE | 10 2012 207 198 A1 | 10/2013 |
| EP | 1 878 961 A1 | 1/2008 |
| EP | 2 000 659 A2 | 12/2008 |
| EP | 2 172 639 B1 | 5/2011 |
| EP | 2 535 365 A1 | 12/2012 |
| EP | 2 679 797 A1 | 1/2014 |
| FR | 2 922 963 A3 | 5/2009 |
| WO | WO 98/11164 A1 | 3/1998 |
| WO | WO 2012/113480 A1 | 8/2012 |

OTHER PUBLICATIONS

Written Opinion of International Searching Authority issued in Application No. PCT/EP2016/067751 dated Oct. 28, 2016 (4 pages).
Office Action of German Patent Office issued in Application No. 10 2015 215 394.0 dated Mar. 31, 2016 (5 pages).
Office Action of European Patent Office issued in corresponding European Application No. 16750411.7 dated Feb. 13, 2019 (4 pages).

* cited by examiner

AIR PIPE FOR THE INTAKE TRACT OF AN INTERNAL COMBUSTION ENGINE

FIELD OF APPLICATION AND PRIOR ART

The invention relates to an air pipe for the intake tract of an internal combustion engine.

Air pipes for the intake tract of an internal combustion engine are known. They are generally used to supply combustion air to an internal combustion engine.

Air pipes that connect an engine air filter to a compressor or turbocharger are referred to as air intake pipes. Corresponding air intake pipes are known for example from the documents DE 102007007119 A1, DE 102012207198 A1, DE 19701118 A1, DE 4032321 A1, DE 19613467 A1, DE 19915819 A1, DE 19745192 A1, EP 2000659 A2, EP 2172639 B1 and WO 2012/113480 A1.

Air pipes that connect a turbocharger to a charge air cooler or a charge air cooler to a throttle valve are usually referred to as charging air pipes. For example, a charging air pipe is the subject matter of DE 202006016187 U1.

In order to meet the requirements of the extreme pressure and temperature conditions prevailing in operation of an internal combustion engine, correspondingly provided air pipes must have a certain mechanical strength, stiffness, and thermal resistance. However, air pipes of the generic type are sometimes characterized by sharply limited material tolerance. This can lead to problems in assembly with other components. For example, in the assembly of generic air intake pipes on an air filter—because of excessive low material tolerance—leaks can occur, with the result that the engine components connected downstream of the air filter can be exposed to dirt and dust particles.

In order to improve material tolerance and prevent the occurrence of leaks, air intake pipes are therefore often connected to an elastomer tube. However, this increases costs and also makes assembly more complicated.

Problem and Solution

The technical problem of the invention is the provision of an air pipe that more particularly avoids the above-mentioned drawbacks of the prior art.

The invention solves this problem by providing an air pipe and by the use of an air pipe having the features discussed below.

According to a first aspect, the invention relates to an air pipe, preferably for the intake tract of an internal combustion engine. The internal combustion engine is preferably a turbo engine, more particularly a biturbo engine.

The air pipe comprises a first pipe component composed of a first material and a second pipe component composed of a second material.

The air pipe according to the present invention is preferably characterized in that the first material is more flexible, more particularly softer and/or more elastic, than the second material.

Within the meaning of the present invention, the term "air pipe" is to be understood as referring to a pipe, more particularly a round pipe, that is configured to supply air, so-called combustion air, to an internal combustion engine. The air can be fresh air, more particularly filtered fresh air, warm or hot air produced by a compressor or turbocharger, or cold air produced by a charge air cooler. Depending thereon, the air pipe according to the invention can for example be an air intake pipe or charging air pipe, which will be discussed in further detail in the following.

Within the meaning of the present invention, the term "pipe component" is to be understood as referring to a tube-shaped component, and more particularly a round tube-shaped component.

A more flexible, more particularly softer or more elastic configuration of the first pipe component compared to the second pipe component leads to an overall improvement, more particularly an expansion, of the material tolerances of the air pipe according to the invention compared to other components, more particularly compared to other components of an engine intake tract. More particularly, because of its preferably more flexible properties, the first pipe is intended for connection to a component such as e.g. an air filter for cases wherein a certain degree of flexibility is desired in order to prevent leakage. In contrast, the second pipe component, because of its preferably stiffer and/or more mechanically strong properties, is more particularly suitable, for example, for connection to a component of the engine compartment, more particularly a turbocharger, for cases wherein considerations of flexibility instead play a secondary role.

On the whole, the air pipe according to the invention can therefore be used in a more versatile manner than conventional air pipes.

In a preferred embodiment, the first material has an elastic modulus of 1000 MPa to 1400 MPa, more particularly 1000 MPa to 1200 MPa, and preferably 1000 MPa to 1100 MPa.

In a further embodiment, the second material has an elastic modulus of 2500 MPa to 3000 MPa, more particularly 2600 MPa to 3000 MPa, and preferably 2700 MPa to 3000 MPa.

The first material is preferably an unreinforced material, i.e. a material that is free of reinforcing means.

In a further embodiment, the first material comprises additives that increase flexibility, and more particularly promote softness and/or elasticity.

The second material preferably comprises a reinforcing means. In other words, the second material is preferably a reinforced material.

The reinforcing means can be selected from the group comprising fibers, particles, more particularly spherical particles, powders, minerals such as silicates, and combinations thereof.

The fibers can be selected from the group comprising inorganic fibers, metallic fibers, organic fibers, natural fibers, and combinations thereof.

The fibers can be more particularly selected from the group comprising basalt fibers, boron fibers, glass fibers, ceramic fibers, silicic acid fibers, steel fibers, polyamide fibers, aramid fibers, carbon/carbonaceous fibers, nylon fibers, polyethylene fibers, plexiglass fibers, flax fibers, hemp fibers, wood fibers, sisal fibers, and combinations thereof.

The fibers can furthermore be long and/or short fibers.

Within the meaning of the present invention, the term "long fibers" is understood to refer preferably to fibers having a length >6 mm, more particularly 7 mm to 50 mm, preferably 7 mm to 20 mm, further preferably 7 mm to 15 mm, and particularly preferably 8 mm to 10 mm.

Within the meaning of the present invention, the term "short fibers" is understood to refer preferably to fibers having a length 6 mm, and more particularly <6 mm. The term "short fibers" is preferably understood within the meaning of the present invention to refer to fibers having a length of 2 mm to 6 mm, further preferably 4 mm to 6 mm, and particularly preferably 4 mm to 5 mm.

The above-mentioned particles can more particularly be glass beads.

In a particularly preferred embodiment, the reinforcing means is selected from the group comprising carbon or carbonaceous fibers, glass fibers, glass beads, minerals such as talc or talcum, and combinations thereof.

In a further embodiment, the reinforcing means accounts for a proportion of 10 wt. % to 50 wt. %, more particularly 15 wt. % to 45 wt. %, and preferably 20 wt. % to 35 wt. % based on the total weight of the second material.

In a further embodiment, the first material comprises a thermoplastic/elastoplastic polymer.

In a further embodiment, the second material comprises a thermoplastic/elastoplastic polymer.

Within the meaning of the present invention, the term "thermoplastic/elastoplastic polymer" refers to a thermoplastic or elastoplastic polymer or a so-called blend of thermoplastic or elastoplastic polymers, i.e. a mixture of two or more different thermoplastic or elastoplastic polymers. With respect to suitable thermoplastic/elastoplastic polymers, reference is made to the following discussion.

Within the meaning of the present invention, the term "elastoplastic polymer" is understood to refer to a thermoplastic elastomer or a so-called blend of thermoplastic elastomers, i.e. a mixture of two or more different thermoplastic elastomers. With respect to suitable thermoplastic elastomers, reference is also made to the following discussion.

Each of the first and second materials preferably comprises a thermoplastic/elastoplastic, and more particularly a thermoplastic polymer.

The first material preferably comprises a different thermoplastic/elastoplastic polymer from the second material.

In a further embodiment, the first material comprises an unreinforced thermoplastic/elastoplastic polymer, i.e. a thermoplastic/elastoplastic polymer that is free of reinforcing means.

In a further embodiment, the second material comprises a reinforced, more particularly fiber-reinforced, preferably glass fiber-reinforced thermoplastic/elastoplastic polymer, i.e. a thermoplastic/elastoplastic polymer that comprises a reinforcing means. With respect to the reinforcing means, reference is made to the above description.

In principle, the polymer can be a homopolymer.

Alternatively, the polymer can be a copolymer, i.e. a polymer comprising two or more monomer units of different types or composed of two or more monomer units of different types.

The polymer can further be a statistical polymer, i.e. a randomized polymer.

Alternatively, the polymer can be a block copolymer, i.e. a segmented copolymer.

The polymer can generally be selected from the group comprising polyolefins, polyethylene, polypropylene, polystyrene, polyamide, and combinations, more particularly blends thereof.

Particularly preferably, the polymer is a polyamide, i.e. a polymer, preferably a linear polymer having regularly repeating amide links along the polymer main chain.

It has been found that the above-mentioned advantages of the invention are particularly apparent in use of polyamides to produce the first and/or second pipe component, and more particularly the first and second pipe component.

More particularly, the polymer can be a homopolyamide. According to the chemical structure, the homopolyamide can be of the aminocarboxylic acid type or the diamine-dicarboxylic acid type. The former is produced from only one monomer, for example by polycondensation of an ω-aminocarboxylic acid or by ring-opening polymerization of cyclic amides (lactams). The diamine-dicarboxylic acid type, in contrast, is produced by polycondensation of two complementary monomers, for example a diamine and a dicarboxylic acid.

In a further embodiment, the polyamide is a homopolyamide that is selected from the group comprising polycaprolactam (polycondensate of ε-caprolactam; also referred to as polyamide 6), polytetramethylene adipamide (polycondensate of tetramethylene diamine and adipic acid; also referred to as polyamide 46), polyhexamethylene adipamide (polycondensate of hexamethylene diamine and adipic acid; also referred to as polyamide 66), polyhexamethylene azelainamide (polycondensate of hexamethylene diamine and azelaic acid; also referred to as polyamide 69), polyhexamethylene sebacinamide (polycondensate of hexamethylene diamine and sebacic acid; also referred to as polyamide 610), polyhexamethylene dodecanamide (polycondensate of hexamethylene diamine and dodecanedioic acid; also referred to as polyamide 612), polyenantholactam (polyamide 7), polyundecanolactam or poly-11-undecanamide (polycondensate of 11-aminoundecanoic acid; also referred to as polyamide 11), polydodecanolactam (polycondensate of ω-laurolactam; also referred to as polyamide 12), polydodecane dodecanamide (polycondensate of dodecane diamine and dodecanedioic acid; also referred to as polyamide 1212) and combinations, more particularly blends thereof.

A particularly suitable polycaprolactam or polyamide 6 is commercially available, for example, under the name Ultramid® B.

A particularly suitable polyhexamethylene adipamide or polyamide 66 is commercially available, for example, under the name Ultramid® A.

A particularly suitable polyhexamethylene sebacinamide or polyamide 610 is commercially available, for example, under the name Ultramid® S.

In a further embodiment, the polyamide is a copolyamide, i.e. a polyamide derived from a plurality of, and preferably at least three different monomers. The copolyamide is preferably a terpolyamide (ternary copolyamide), i.e. a polyamide derived from three different monomers.

In a further embodiment, the polyamide is a copolyamide that is selected from the group comprising poly(hexamethylene adipamide co-caprolactam) (polycondensate of hexamethylene diamine, adipic acid and ε-caprolactam; also referred to as polyamide 6/66), polyamide 6T/6, polyamide 6T/66, polyamide 6T/66/6I, polyamide 6T/6I, polyamide 66/610 and combinations, more particularly blends, thereof.

A particularly suitable poly(hexamethylene adipamide co-caprolactam) or polyamide 6/66 is commercially available, for example, under the name Ultramid° C.

Within the meaning of the present invention, the term "polyamide 6T/6" defines a polycondensate of hexamethylene diamine, terephthalic acid, and ε-caprolactam. A particularly suitable polyamide 6T/6 is commercially available, for example, under the name Ultramid® T.

Within the meaning of the present invention, the term "polyamide 6T/66" defines a polycondensate of hexamethylene diamine, terephthalic acid, and adipic acid.

Within the meaning of the present invention, the term "polyamide 6T/66/6I" defines a polycondensate of hexamethylene diamine, terephthalic acid, adipic acid, and isophthalic acid.

Within the meaning of the present invention, the term "polyamide 6T/6I" defines a polycondensate of hexamethylene diamine, terephthalic acid, and isophthalic acid.

Within the meaning of the present invention, the term "polyamide 66/610" defines a polycondensate of hexamethylene diamine, adipic acid, and sebacic acid.

In a further embodiment, the polyamide is more particularly a homo- or copolyamide selected from the group comprising Ultramid® A unreinforced, Ultramid® A reinforced, Ultramid® B unreinforced, Ultramid® B reinforced, Ultramid® D Aqua reinforced, Ultramid® S Balance unreinforced, Ultramid® S Balance reinforced, Ultramid® T unreinforced, Ultramid® T reinforced and combinations, more particularly blends thereof.

In a preferred embodiment, the first material comprises a different polyamide from the second material. The first material preferably comprises a copolyamide, more particularly a terpolyamide, and the second material a homopolyamide. With respect to suitable polyamides, more particularly homo- and/or copolyamides, reference is made to the above description.

In a particularly preferred embodiment, the first material comprises an unreinforced polyamide, more particularly unreinforced copolyamide, and preferably unreinforced terpolyamide, i.e. a polyamide, more particularly copolyamide, and preferably terpolyamide that is free of reinforcing means. With respect to suitable polyamides, more particularly copolyamides, and preferably terpolyamides, reference is also made to the above description.

The first material preferably comprises a terpolyamide, more particularly unreinforced terpolyamide, that is produced from hexamethylene diamine, adipic acid, and s-caprolactam. In other words, the first material preferably comprises poly(hexamethylene adipamide co-caprolactam), i.e. a polycondensate of hexamethylene diamine, adipic acid, and s-caprolactam (polyamide 6/66). More particularly, the terpolyamide can be a warm- or heat-stabilized terpolyamide.

In a further embodiment, the second material comprises a reinforced polyamide, more particularly reinforced homopolyamide, i.e. a polyamide compounded or provided with a reinforcing means, and more particularly a homopolyamide. The second material preferably comprises a fiber-reinforced, and preferably a glass fiber-reinforced polyamide, more particularly a homopolyamide. With respect to suitable polyamides, more particularly homopolyamides, and with respect to the reinforcing means, reference is made to the above description.

The second material preferably comprises a homopolyamide, more particularly a reinforced, preferably fiber-reinforced, and particularly preferably glass fiber-reinforced homopolyamide of the diamine-dicarboxylic acid type. The homopolyamide is preferably polyhexamethylene adipamide, i.e. a polycondensate of hexamethylene diamine and adipic acid (polyamide 66). With respect to further features of the reinforcing means, reference is made to the above description.

The polyamides, more particularly the copolyamides, described in the preceding embodiments are characterized by increased mechanical strength, stiffness, and thermal resistance compared to other materials. More particularly, they are further characterized by increased resistance to exogenous influences, such as e.g. marten bites. At the same time, they have sufficiently flexible properties to allow a flexible and therefore better sealed connection to an engine air filter or another component of the engine intake tract, for example.

In principle, the first pipe component and the second pipe component can be connected to each other by means of a positive locking, non-positive locking, and/or materially locking manner.

However, the first pipe component and the second pipe component are preferably connected to each other in a materially locking manner, and more particularly in an exclusively materially locking manner. This provides the advantage of simpler assembly of the pipe components into the air pipe according to the invention. More particularly, the use of fastening means, such as e.g. hose clamps, can be dispensed with. This also eliminates the risk that the integrity and therefore the leak-tightness of the air pipe, and more particularly of the first pipe component and/or the second pipe component, could be impaired by a fastening means. A further advantage lies in material savings, more particularly in the first pipe component. In the case of a materially locking connection, more particularly for the first pipe component, the wall thickness required for the assembly step is reduced, which contributes towards making the first pipe component even more flexible.

In principle, the first pipe component and the second pipe component can be glued to each other. In other words, it can generally be provided according to the invention that the first pipe component and the second pipe component are connected to each other by means of an adhesive connection.

However, it is preferred according to the invention for the first pipe component and the second pipe component to be connected to each other by welding. In other words, it is preferred according to the invention if the first pipe component and the second pipe component are connected to each other by means of a welded joint. In the case of a welded joint, the advantages mentioned two paragraphs above are particularly apparent.

In principle, the first pipe component and the second pipe component can be connected to each other by means of pressure joint welding, vibration welding, and/or ultrasound welding.

Preferably, the first pipe component and the second pipe component are connected to each other by means of pressure joint welding, more particularly friction welding, and preferably rotary friction welding.

The first pipe component and the second pipe component can further be produced by means of injection molding, blow molding, extrusion, or combinations of these techniques. As these methods are known to the person skilled in the art, further discussion thereof will be dispensed with.

Accordingly, the first pipe component and/or the second pipe component can be configured as injection molded parts, blow molded parts, or extruded parts.

Particularly preferably, the first pipe component and the second pipe component are configured as blow molded parts respectively.

In a further embodiment, the first pipe component is shorter than the second pipe component.

In a further embodiment, the first pipe component has a wall thickness of 1.8 mm to 2.2 mm, more particularly 2.0 mm to 2.2 mm, and preferably 2.0 mm to 2.1 mm.

In a further embodiment, the second pipe component has a wall thickness of 2.4 mm to 3.5 mm, more particularly 2.5 mm to 3.5 mm, and preferably 2.5 mm to 3.0 mm.

In a further embodiment, an upstream end and/or a downstream end of the air pipe, more particularly an upstream end of the first pipe component and/or a downstream end of the second pipe component, is connected to a connecting piece. The connection can be a positive locking, non-positive locking and/or materially locking connection.

Preferably, an upstream end and/or a downstream end of the air pipe, more particularly an upstream end of the first pipe component and/or a downstream end of the second pipe component, is connected in a non-positive locking manner to a connecting piece.

Within the meaning of the present invention, the term "upstream end of the air pipe, more particularly of the first pipe component" is understood to refer to an end of the air pipe, more particularly of the first pipe component, at which air, more particularly filtered fresh air, warm or hot air produced by a compressor or turbocharger, or cold air produced by a charge air cooler flows into the air pipe, and more particularly into the first pipe component.

Within the meaning of the present invention, the term "downstream end of the air pipe, more particularly of the second pipe component" is understood to refer to an end of the air pipe, more particularly of the second pipe component, at which air, and more particularly filtered fresh air, warm or hot air produced by a compressor or turbocharger, or cold air produced by a charge air cooler flows out from the air pipe, and more particularly from the second pipe component.

The connecting piece may be a connecting piece for an air filter, a compressor or a turbocharger, or a charge air cooler or an engine cylinder.

For example, it can be provided according to the invention that an upstream end of the air pipe, more particularly of the first pipe component, is connected to a connecting piece for an air filter and/or that a downstream end of the air pipe, more particularly of the second pipe component, is connected to a connecting piece for a compressor or turbocharger. In other words, it can be provided according to the invention that an upstream end of the air pipe, more particularly of the first pipe component, is provided for connection to an air filter and/or that a downstream end of the air pipe, more particularly of the second pipe component, is provided for connection to a compressor or turbocharger.

It can further be provided according to the invention that an upstream end of the air pipe, more particularly of the first pipe component, is connected to a connecting piece for a compressor or turbocharger and/or that a downstream end of the air pipe, more particularly of the second pipe component, is connected to a connecting piece for a charging air pipe. In other words, it can be provided according to the invention that an upstream end of the air pipe, more particularly of the first pipe component, is provided for connection to a compressor or turbocharger and/or that a downstream end of the air pipe, more particularly of the second pipe component, is provided for connection to a charge air cooler.

It can further be provided according to the invention that an upstream end of the air pipe, more particularly of the first pipe component, is connected to a connecting piece for a charging air pipe and/or that a downstream end of the air pipe, more particularly of the second pipe component, is connected to a connecting piece for an engine cylinder. In other words, it can be provided according to the invention that an upstream end of the air pipe, more particularly of the first pipe component, is provided for connection to a charge air cooler and/or that a downstream end of the air pipe, more particularly of the second pipe component, is provided for connection to an engine cylinder.

In an advantageous embodiment, the connecting piece is configured in a circumferential direction of the air pipe, more particularly of the first pipe component and/or the second pipe component.

More particularly, the connecting piece can be configured in a circular ring shape or an essentially circular ring shape.

The connecting piece is preferably configured as a sleeve.

In an advantageous embodiment from the standpoint of sealing, the connecting piece is a sealing connecting piece.

The connecting piece preferably comprises an elastomer material or is composed of an elastomer material. More particularly, the elastomer can be a rubber material, and preferably acrylate rubber or ethylene acrylate rubber. Ethylene acrylate rubber is preferred according to the invention, and is commercially available, for example under the name Vamac®.

In a further embodiment, the connecting piece comprises a recess running in a circumferential direction, preferably a groove. The recess is preferably configured to accommodate a fastening means, preferably a hose clamp.

In an alternative embodiment, an upstream end of the air pipe, more particularly of the first pipe component, and/or a downstream end of the air pipe, more particularly of the second pipe component, are directly connected, i.e. without using a connecting piece, by means of a fastening device, more particularly a hose clamp. To the extent possible, the above statements on the connecting piece apply correspondingly.

In a further embodiment, the air pipe according to the invention is an air intake pipe.

Within the meaning of the present invention, the term "air intake pipe" is to be understood to refer to an air pipe which, in the intake tract of an internal combustion engine, connects an air filter to a compressor or turbocharger or a charge air cooler to a throttle valve.

In an alternative embodiment, the air pipe is a charging air pipe.

Within the meaning of the present invention, the term "charging air pipe" is understood to refer to an air pipe which, in the intake tract of an internal combustion engine, connects a compressor or turbocharger to a charge air cooler.

A second aspect of the invention relates to the use of an air pipe according to a first aspect of the invention for the intake tract of an internal combustion engine, more particularly a turbo engine.

With respect to further features and advantages, more particularly of the air pipe, full reference is made to the statements made within the framework of the first aspect of the invention, which also apply (mutatis mutandis) to the second aspect of the invention.

A third aspect of the invention relates to the use of an air pipe as an air intake pipe, wherein the air pipe comprises a first pipe component composed of a first material and a second pipe component composed of a second material, and wherein the first material is more flexible than the second material.

With respect to further features and advantages of the air pipe, full reference is also made to the statements made within the framework of the first aspect of the invention, which also apply (mutatis mutandis) to the third aspect of the invention.

A fourth aspect of the invention relates to the use of an air pipe as a charging air pipe, wherein the air pipe comprises a first pipe component composed of a first material and a second pipe component composed of a second material, wherein the first material is more flexible than the second material.

With respect to further features and advantages of the air pipe, full reference is also made to the statements made within the framework of the first aspect of the invention, which also apply (mutatis mutandis) to the fourth aspect of the invention.

Further features and advantages are discussed in the following description of preferred embodiments by means of figures and in the accompanying descriptions of the figures. The embodiments described below are intended solely to explain the invention in further detail, without limiting the invention thereto. In this case, the individual features can each be implemented independently or in combination with one another.

BRIEF DESCRIPTION OF THE DRAWINGS

The following is shown diagrammatically in the figures.

DETAILED DESCRIPTION OF THE FIGURES

Figure 1:
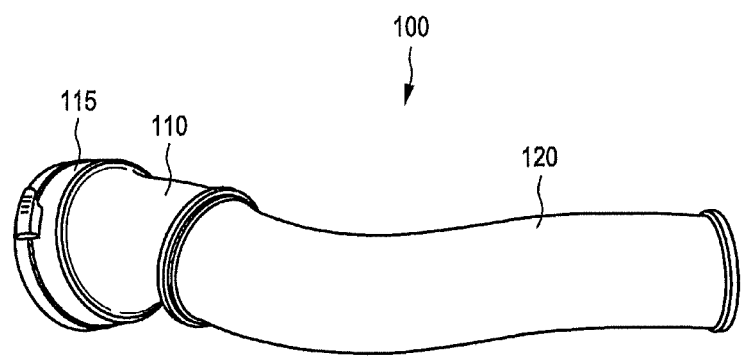
FIG. 1: an embodiment of an air pipe according to the invention

FIG. 1 shows a diagrammatic illustration of an air pipe 100 which comprises a first pipe component 110 and a second pipe component 120.

The first pipe component 110 and the second pipe component 120 are connected to each other in a materially locking manner. The first pipe component 110 and the second pipe component 120 are preferably connected to each other by means of a welded joint. The welded joint preferably runs along the contact surface between the first pipe component 110 and the second pipe component 120. The welded joint is preferably a friction-welded joint.

The first pipe component 110 is composed of a more flexible material than the second pipe component 120.

The material of the first pipe component 110 preferably comprises a copolyamide. The copolyamide is preferably produced by polycondensation of hexamethylene diamine, adipic acid, and ε-caprolactam (polyamide 6/66).

The material of the second pipe component 120 preferably comprises a reinforced, more particularly a glass fiber-reinforced homopolyamide. The homopolyamide is preferably polyhexamethylene adipamide, i.e. a polycondensate of hexamethylene diamine and adipic acid (polyamide 66).

Both the copolyamide of the first pipe component 110 and the homopolyamide of the second pipe component 120 show sufficient mechanical strength, stiffness, and temperature resistance to withstand the pressures and temperatures arising during operation of an internal combustion engine, more particularly a turbo engine.

At the same time, the copolyamide of the first pipe component 110 has sufficiently flexible properties to allow a sealing connection with an engine air filter to be achieved, for example.

The air pipe 100, more particularly the first pipe component 110, can be connected at its upstream end 111 to a connecting piece 115, for example for an air filter. The connecting piece 115 can be configured as a sleeve, and from the standpoint of increased sealing, it is preferably composed of an elastomer material, more particularly ethylene acrylate rubber.

Figure 2:
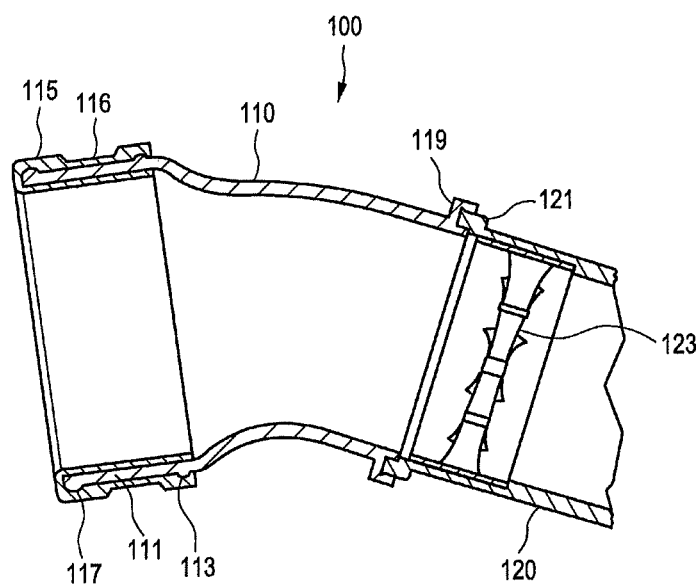
FIG. 2: a longitudinal section of a part of the air pipe shown in FIG. 1.

FIG. 2 diagrammatically shows a longitudinal section of a part of the air pipe 100 shown in FIG. 1.

It can be seen that an upstream end 111 of the first pipe component 110 having an enlarged diameter compared to the rest of the first pipe component 110 is engaged in a preferably circular ring-shaped recess of the connecting piece 115. For this purpose, the upstream end 111 preferably comprises two ridges 113; 117, spaced parallel to one another and running circumferentially, which are accommodated in the recess on engagement of the protrusions having complementary shapes.

It can also be seen that a projecting upstream end 121 of the second pipe component 120 is accommodated by a groove formed on the downstream end 119 of the first pipe component 110, which is open in the direction of the upstream end 121.

A welding seam preferably runs in a circumferential direction of the air pipe between the groove and the upstream end 121.

In order to prevent a throttle valve from being damaged by condensed water, it can further be provided that the second pipe component 120 comprises a condensed water non-return valve 123. This valve collects condensed water and allows it to evaporate.

Moreover, the connecting piece 115 can comprise a circumferential groove 116 for accommodating a fastening means, such as e.g. a hose clamp.

The invention claimed is:

1. An air pipe for an intake tract of an internal combustion engine, the air pipe comprising:
   a first pipe component composed of a first material; and
   a second pipe component composed of a second material, wherein the first material is more flexible than the second material and the first pipe component and the second pipe component are connected to each other by a welded joint, the welded joint runs along a contact surface between the first pipe component and the second pipe component, the first material comprises a polyamide which is selected from the group consisting of polyamide 6, polyamide 46, polyamide 66, polyamide 66/6, and polyamide 6T/66/6I, and the second material comprises a reinforced polyamide which is selected from the group consisting of polyamide 6, polyamide 46, polyamide 66, polyamide 66/6, and polyamide 6T/66/6I.

2. The air pipe as claimed in claim 1, wherein the first material is unreinforced.

3. The air pipe as claimed in claim 1, wherein the second material further comprises a reinforcing material selected from the group consisting of:
   carbon or carbonaceous fibers, glass fibers, glass beads, minerals and combinations thereof.

4. The air pipe as claimed in claim 1, wherein the first material is (poly(hexamethylene adipamide co-caprolactam).

5. The air pipe as claimed in claim 1, wherein the second material is glass fiber-reinforced.

6. The air pipe as claimed in claim 5, wherein the second material comprises a homopolyamide.

7. The air pipe as claimed in claim 6, wherein the homopolyamide is of the diamine-dicarboxylic acid type.

8. The air pipe as claimed in claim 1, wherein the first pipe component and the second pipe component are connected to each other in a materially locking manner.

9. The air pipe as claimed in claim 1, wherein the first pipe component and the second pipe component are connected to each other by pressure joint welding.

10. The air pipe as claimed in claim 9, wherein the pressure joint welding involves friction welding.

11. The air pipe as claimed in claim 9, wherein the pressure joint welding involves rotary friction welding.

12. The air pipe as claimed in claim 1, wherein the air pipe is an air intake pipe.

13. The air pipe as claimed in claim 1, wherein the air pipe is a charging air pipe.

* * * * *